(12) United States Patent
Basballe Sorensen et al.

(10) Patent No.: US 11,368,480 B2
(45) Date of Patent: Jun. 21, 2022

(54) SYSTEMS AND METHODS FOR AUTOMATED DETECTION OF CYBERSECURITY PERFORMANCE GAPS

(71) Applicant: Christian Lee Basballe Sorensen, Arlington, VA (US)

(72) Inventors: Christian Lee Basballe Sorensen, Arlington, VA (US); Christopher Thomas Puderbaugh, Annandale, VA (US)

(73) Assignee: Sight Gain Inc., Mason, OH (US)

(*) Notice: Subject to any disclaimer, the term of this patent is extended or adjusted under 35 U.S.C. 154(b) by 284 days.

(21) Appl. No.: 16/888,666

(22) Filed: May 30, 2020

(65) Prior Publication Data
US 2020/0382547 A1 Dec. 3, 2020

Related U.S. Application Data

(60) Provisional application No. 62/853,767, filed on May 29, 2019.

(51) Int. Cl.
*H04L 9/40* (2022.01)
*G06F 21/57* (2013.01)
*G06F 21/56* (2013.01)

(52) U.S. Cl.
CPC .......... *H04L 63/1433* (2013.01); *G06F 21/56* (2013.01); *G06F 21/577* (2013.01); *H04L 63/1441* (2013.01)

(58) Field of Classification Search
CPC . H04L 63/1433; H04L 63/1441; G06F 21/05; G06F 21/57
See application file for complete search history.

(56) References Cited

U.S. PATENT DOCUMENTS

| | | | |
|---|---|---|---|
| 9,800,605 B2* | 10/2017 | Baikalov | H04L 63/1433 |
| 2016/0226894 A1* | 8/2016 | Lee | G06F 21/552 |
| 2018/0324218 A1* | 11/2018 | Xie | H04L 41/12 |
| 2019/0215328 A1* | 7/2019 | Honig | H04L 63/14 |

* cited by examiner

*Primary Examiner* — Ali S Abyaneh

(57) ABSTRACT

Techniques for mitigating cybersecurity performance gaps in an organization are disclosed. The method comprises the steps of selecting a threat framework for formulating a threat detection strategy, mapping most likely adversary tactics that may be used to circumvent the threat detection strategy, updating the threat detection strategy, and performing threat detection to determine threat assessment scores. Further, the determined scores are categorized and contextualized to identify cybersecurity gaps in the organization. These gaps are prioritized based on certain criteria to provide automated recommendations and alerts regarding cybersecurity performance gaps and related organizational risks.

11 Claims, 7 Drawing Sheets

ORGANIZATIONAL RISKS

1. INSIDER DATA LOSS
RISK CATEGORY: DATA LOSS
IMPACT 0.11
LIKELIHOOD: 1.6%
EXPOSURE: $1,013,409

RECOMMENDATIONS:
TECHNOLOGY -- EDR DETECTED 58% OF INCIDENTS, BUT PREVENTED 44% OF THOSE INCIDENTS. CONSIDER RECONFIGURING EDR BLOCK POLICIES.

2. ATP DATA BREACH LOSS
RISK CATEGORY: DATA LOSS
IMPACT 0
LIKELIHOOD: 0%
EXPOSURE: $13,409

RECOMMENDATIONS: ———

SYSTEMS AND METHODS FOR AUTOMATED DETECTION OF CYBERSECURITY PERFORMANCE GAPS

RELATED APPLICATIONS

This application claims the benefit of U.S. Provisional Patent Application Ser. No. 62/853,767 entitled, "System and Software for Automating Threat Based Cybersecurity Assessments", filed May 29, 2020, which is incorporated herein in its entirety.

TECHNICAL FIELD

The present disclosure is related to the field of cybersecurity. More particularly, the present disclosure is related to methods, techniques, and systems for performing automated assessment of cybersecurity performance gaps in an organization.

BACKGROUND

In a highly connected world where almost every business is dependent on the internet for its functioning, cybersecurity becomes an important aspect for smooth functioning of organizations. While conventional brick and mortar businesses invested heavily in physical security at their offices and warehouses, modern businesses that are more reliant on the internet have to take care of both physical security as well as virtual (cyber) security to protect their assets and interests. In computing, cybersecurity or information technology security (IT security) is the protection of computer systems and networks from the theft of or damage to their hardware, software, or electronic data, as well as from the disruption or misdirection of the services they provide. The field of cybersecurity has become more important due to increased reliance on computer systems, the internet and wireless network standards such as Bluetooth, Near-field Communication (NFC), Wi-Fi, etc. Furthermore, the unprecedented growth of "smart" devices, including smartphones, personal computers, and the various devices that constitute the "Internet of things" has increased the importance of cybersecurity exponentially.

An organization's assets that are connected to the internet or even local networks constantly face a wide variety of external threats from attackers. The attackers range from individuals and organizations to hostile government agencies. The types of attacks could range from Denial-of-Service (DoS), direct-access, eavesdropping, multi-vector attacks, phishing, privilege escalation, spoofing, social engineering, tampering, backdoor attacks, and the like.

While solutions such as vulnerability scanning, threat simulation, and cyber reputation have been proposed by prior arts, they fail to meet real world scenarios that consider factors such as guessing the tactics that may be used by the adversaries, testing the capabilities of cybersecurity processes of an organization, and the like. Solutions that try to access security capabilities by linking them with compliance may not be adequate since in most of the cases compliance may not equate to actual protection.

Furthermore, solutions that attempt to assess protection against simulated threat traffic fail to meet the needs of the industry since they often fail to identify the capabilities that are participating in this protection. They also fail to take into account the real world threats that a customer may most likely face. Other solutions that assesses cybersecurity gaps through external observation fail to meet industry needs because they only identify problems after they occur so they cannot prevent them from happening. They fail in comprehensively testing for issues that may be present internally, such solutions fail to identify gaps that could be compromised.

Hence, it will be useful to provide a solution that can help organizations identify cybersecurity performance gaps before they are exploited by likely threats and provide recommendations to mitigate the same.

BRIEF DESCRIPTION OF THE DRAWINGS

FIG. 7 is an exemplary view of a dashboard summarizing various operational risks stemming from cybersecurity in an organization according to the embodiments of the present disclosure;

The drawings described herein are for illustration purposes only and are not intended to limit the scope of the present subject matter in any way.

DETAILED DESCRIPTION

Embodiments described herein discloses a computer-implemented method and associated systems for mitigating cybersecurity performance gaps in an organization. The method may be executed by a processor storing one or more instructions. The method comprises the steps of selecting a threat framework for formulating a threat detection strategy. Herein standard threat frameworks may be readily used for formulating the threat detection strategy or a new threat framework may be generated. Upon selecting/generating the threat strategy, adversary tactics that may be used to circumvent the threat detection strategy based on the selected threat framework is determined. Upon determining the adversary tactics, they may be mapped to the selected threat framework to update the threat detection strategy. Once the threat detection strategy is finalized, the tests for performing threat detection may be executed to determine a test result data in the form of threat assessment scores. The determined scores may be categorized and contextualized to identify cybersecurity gaps in the organization. These gaps may be prioritized based on certain criteria to provide automated recommendations and alerts regarding cybersecurity performance gaps and related organizational risks.

In the foregoing sections, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, inventive subject matter lies in less than all features of a single disclosed embodiment. Thus, the following claims are hereby incorporated into the detailed description, with each claim standing on its own as a separate embodiment.

Figure 1:
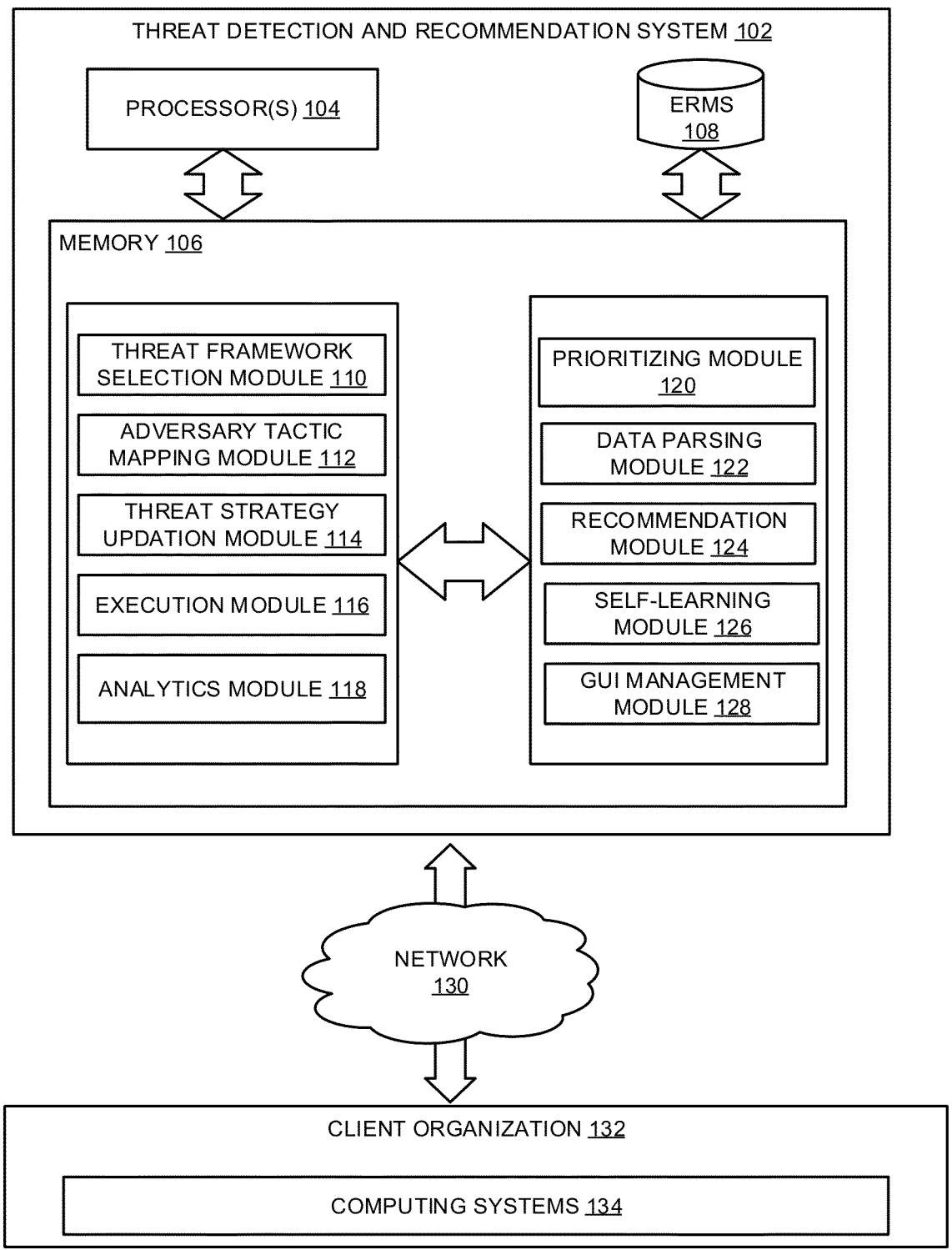
FIG. 1 is a block diagram of the architecture of a threat detection and recommendation system according to the embodiments of the present disclosure.

FIG. 1 is a block diagram 100 of a threat detection and recommendation system 102 connected to a client organization 132 having one or more computing systems 134 via a network 130. As shown in FIG. 1, the threat detection and recommendation system 102 may include processor(s) 104 and memory 106 that are communicatively coupled to each other. Further, the threat detection and recommendation system 102 may include an enterprise repository management system (ERMS) 108 that may be communicatively connected to the memory 106. Furthermore, as shown in FIG. 1, memory 106 may include a threat framework selection module 110, an adversary tactic mapping module 112, a threat strategy updation module 114, an execution module 116, an analytics module 118, a prioritizing module 120, a data parsing module 122, a recommendation module 124, a self-learning module 126, and a GUI management module 128.

Components of threat detection and recommendation system 102 may be any combination of hardware and programming to implement the functionalities described herein. In some implementations, the programming may be processor 104 executable instructions stored on a non-transitory machine-readable storage medium (e.g., memory 106), and the hardware may include at least one processing resource to retrieve and/or execute those instructions. Processor(s) 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. Processor(s) 104 thus may also include the functionality to encode messages and/or data or information. Processor(s) 104 may include, among other things, a clock, an arithmetic logic unit (ALU) and logic gates configured to support operation of processor(s) 104. Further, the processor(s) 104 may include functionality to execute one or more software programs, which may be stored in the memory 106 or otherwise accessible to processor(s) 104.

Memory 106, may store any number of pieces of information, and data, used by the system to implement the functions of the system. The memory 106 may include for example, volatile memory and/or non-volatile memory. Examples of volatile memory may include but are not limited to volatile random-access memory (RAM). The non-volatile memory may additionally or alternatively comprise an electrically erasable programmable read only memory (EEPROM), flash memory, hard drive, and the like. Some examples of the volatile memory include, but are not limited to, dynamic RAM, static RAM, and the like. Some example of the non-volatile memory includes, but are not limited to, hard disks, magnetic tapes, optical disks, programmable read only memory, erasable programmable read only memory, electrically erasable programmable read only memory, flash memory, and the like. Memory 106 may be configured to store information, data, applications, instructions or the like for enabling the system to carry out various functions in accordance with various example embodiments. Additionally, or alternatively, the memory 106 may be configured to store instructions which when executed by processor(s) 104 causes the threat detection and recommendation system 102 to behave in a manner as described in various embodiments.

In one implementation, the network 130 may be a wireless network, a wired network or a combination thereof. The network 130 may be implemented as one of the several types of networks, such as intranet, local area network (LAN), wide area network (WAN), the internet, and the like. The network 130 may either be a dedicated network or a shared network. The shared network represents an association of the several types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 130 may include a variety of network devices, including routers, bridges, servers, computing devices, storage devices, and the like.

During operation, the threat framework selection module 110 may aid in selecting a threat framework, creating new threat frameworks, or in modifying any existing threat framework. A plurality of threat framework may be available by default to perform cyber threat analysis. Cyber threat frameworks enable consistent characterization and categorization of cyber threat events, and helps in identifying trends or changes in the activities of cyber adversaries. Such frameworks capture the adversary life cycle from (a) "preparation" of capabilities and targeting to (b) initial "engagement" with the targets or temporary nonintrusive disruptions by the adversary to (c) establishing and expanding the "presence" on target networks, to (d) the creation of "effects and consequences" from theft, manipulation, or disruption. The framework categorizes the activity in increasing layers of detail.

Herein, the first stage "preparation" (categorized under external action; pre-execution actions) comprise: activities undertaken by a threat actor, their leadership and/or sponsor to prepare for conducting malicious cyber activities, e.g., establish governance and articulating intent, objectives, and strategy; identify potential victims and attack vectors; securing resources and develop capabilities; assess intended victim's cyber environment; and define measures for evaluating the success or failure of threat activities. The second stage "engagement" (categorized under external action; operational actions) comprise: threat actor activities taken prior to gaining but with the intent to gain unauthorized access to the intended victim's physical or virtual computer or information system(s), network(s), and/or data stores. The third stage, "presence" (categorized under internal action) comprise: actions taken by the threat actor once unauthorized access to victim(s)' physical or virtual computer or information system has been achieved that establishes and maintains conditions or allows the threat actor to perform intended actions or operate at will against the host physical or virtual computer or information system, network and/or data stores. The fourth stage, "Effect/Consequence" (categorized under internal actions) comprise: outcomes of threat actor actions on a victim's physical or virtual computer or information system(s), network(s), and/or data stores. The second layer includes objectives that define the purpose of conducting an action or a series of actions. The third layer includes actions that define associated resources used by a threat actor to satisfy an objective. In a four-layer framework, the fourth layer may include indicators that may be discrete threat intelligence data.

The present disclosure allows users to select standard threat frameworks or use a modified version of any threat framework as per their requirement and use case. Once a threat framework is selected using the threat framework selection module 110, the adversary tactic mapping module 112 allows upload, edit, or creation of an assessment of the prevalence of adversary cyber threat tactics relative to the selected threat framework. The entities for which adversary tactics may be looked upon includes network, cloud, endpoint, and e-mails. The tactics mapping module 112 may allow mapping selected threat frameworks to representative adversary cyber threat tactics. These may be tested on target systems based on an updated threat strategy. The threat strategy updation module 114 may update the test strategy based on the mapping and adversary tactics. Further, a cybersecurity threat detection test may be performed based on the updated threat detection strategy to determine a threat assessment score by the execution module 116. The test results that may be received as data in the form of threat assessment scores may further be analysed by the analytics module 118 to determine various pain points in the cyber security infrastructure of the organization. Herein, the analytics module 118 may contextualize the determined threat assessment score based on the selected threat framework. The analytics module 118 may work alongside the data parsing module 122 and self-learning module 126 to determining cybersecurity gaps within the selected threat framework based on the contextualized test results. The prioritizing module 120 may prioritize the determined cybersecurity gaps based on the threat assessment score and one or more factors associated with the organization's operational environment and architecture. The one or more factors associated with the organization's operational environment herein may include cybersecurity requirements of the organization, business verticals of the organization, cybersecurity budget, operational expenditure, personnel expenditure, personnel training, and the like. The data parsing module 122 and the analytics module 118 may combine various data points to assess threat scores from various sources of the cybersecurity architecture. The self-learning module 126 may store historical data and connects old alerts with new findings to learn about the historical trends of an organization to predict possible threats that may occur in future. The recommendation module 124 may provide automated recommendations and alerts regarding cyber security threats and their effect on the operational risk and business exposure of the organization. Herein, operational risk may include issues related to operations of the computing systems of the organization without running into a cybersecurity fallout. The less an organization invests into cybersecurity, the more chances it has for running into operational risks caused by cybersecurity fallouts. Business exposure of the organization depends on the degree to which the organization's business is dependent on the computing systems for day to day operations. While cybersecurity fallouts may affect entire operation of some sector (eg: banking and stock markets) it may not completely stop operations in certain business models (eg: medium and small scale businesses). The Graphical User Interface (GUI) module may 128 convert the numerical results to visual representation and presents them in a dashboard.

Figure 2:
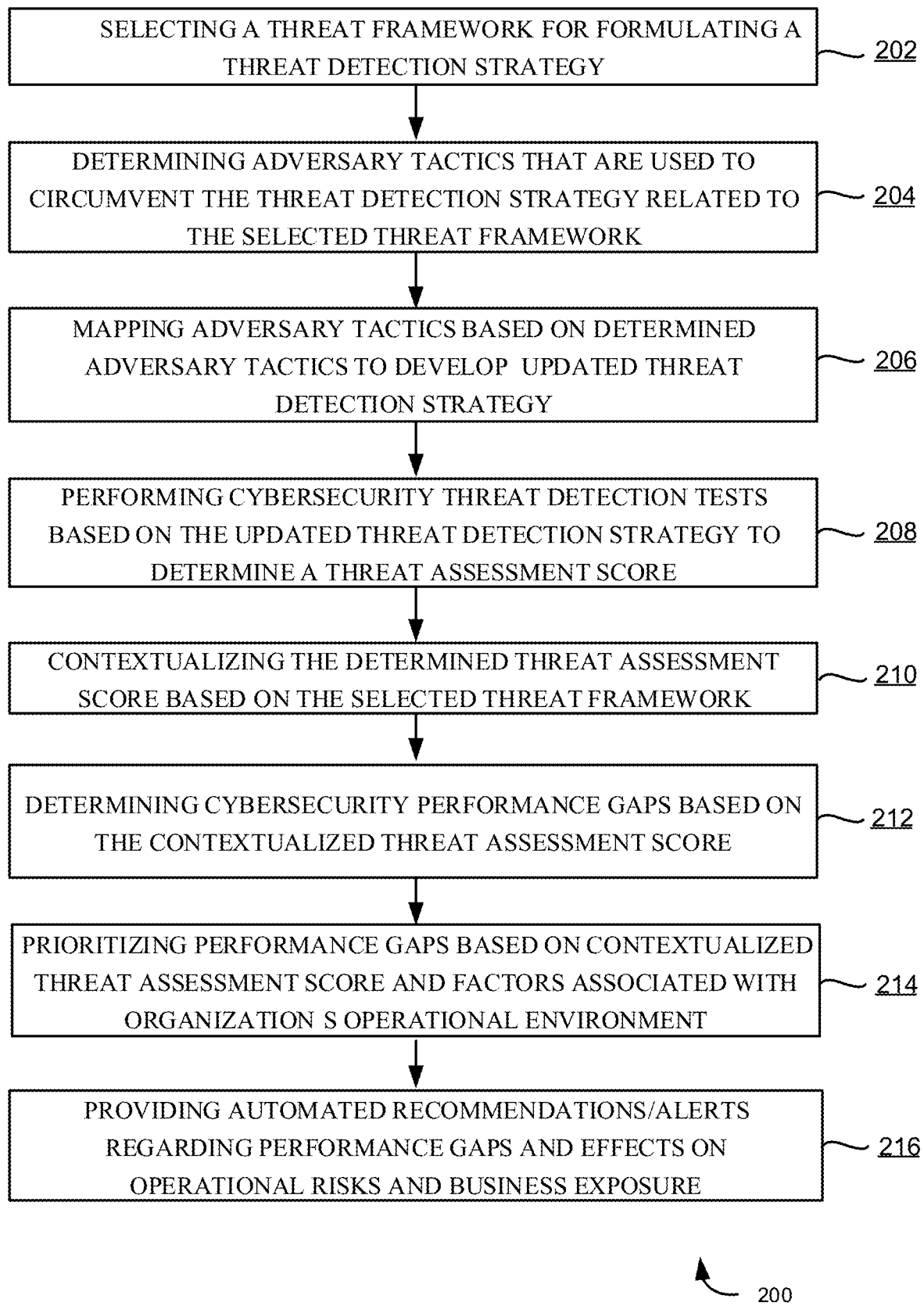
FIG. 2 is an example flow diagram of a method for mitigating cybersecurity performance gaps in an organization according to the embodiments of the present disclosure.

FIG. 2 is an example flow diagram 200 of a method for mitigating cybersecurity performance gaps in an organization. The process depicted in FIG. 2 represents generalized illustrations, and that other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. Alternatively, the processes may represent functions and/or actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design/fabricate circuits, generate programs, or use a combination of hardware and program to perform the illustrated processes.

At 202, the method performs the step of selecting a threat framework for formulating a threat detection strategy. At 204, the method performs the step of determining adversary tactics that are used to circumvent the threat detection strategy related to the selected threat framework. At 206, the method performs the step of mapping adversary tactics based on the determined adversary tactics to develop an updated threat detection strategy. At 208, the method performs the step of performing cybersecurity threat detection tests based on the updated threat detection strategy to determine a threat assessment score. At 210, the method performs the step of contextualizing the determined threat assessment score based on the selected threat framework. At 212, the method performs the step of determining cybersecurity gaps based on the contextualized threat assessment score. At 214, the method performs the step of prioritizing the determined cybersecurity gaps based on the contextualized threat assessment score and one or more factors associated with the organization's operational environment. Furthermore, cybersecurity investments and operational risk exposure are also considered. At 216, the method performs the step of providing automated recommendations and alerts regarding the cyber security performance gaps and their effect on the operational risk and business exposure of the organization.

Figure 3:
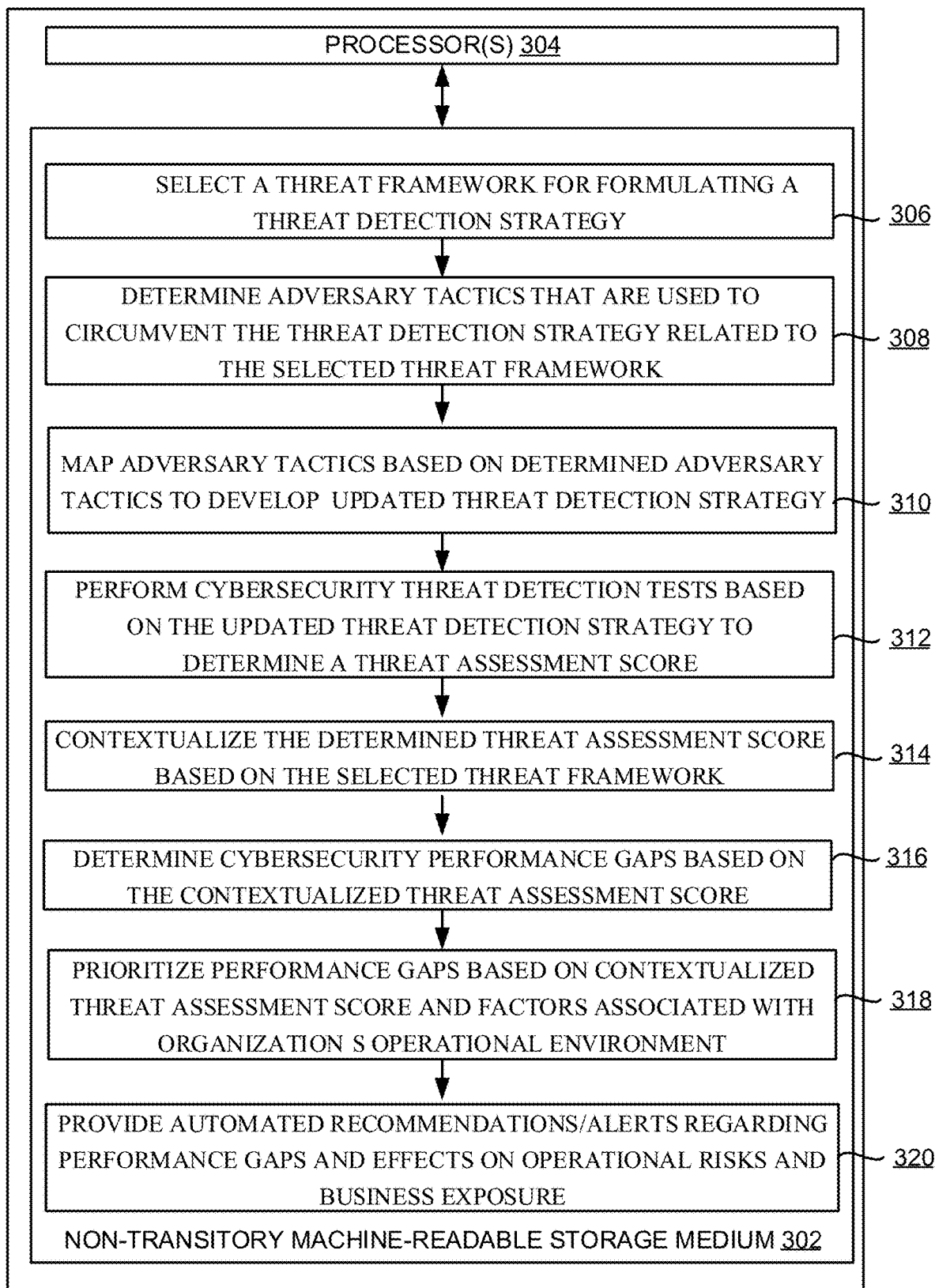
FIG. 3 is a block diagram of an example machine-readable storage medium storing instructions for mitigating cybersecurity performance gaps in an organization according to the embodiments of the present disclosure.

FIG. 3 is a block diagram 300 of an example computing system including instructions stored in a machine-readable storage medium 302 for mitigating cybersecurity performance gaps in an organization. The computing system 300 may include a processor(s) 304 and a non-transitory machine-readable storage medium 302 communicatively coupled through a system bus. The processor 304 may be any type of central processing unit (CPU), microprocessor, or processing logic that interprets and executes machine-readable instructions stored in the machine-readable storage medium 302. The machine-readable storage medium 302 may be a random-access memory (RAM) or another type of dynamic storage device that may store information and machine-readable instructions that may be executed by the processor 304. For example, the machine-readable storage medium 302 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 302 may be a non-transitory machine-readable medium. In an example, the machine-readable storage medium 302 may be remote but accessible to computing system 300.

At 306, the machine-readable storage medium instructs the system to select a threat framework for formulating a threat detection strategy. At 308, the machine-readable storage medium instructs the system to determine adversary tactics that are used to circumvent the threat detection strategy related to the selected threat framework. At 310, the machine-readable storage medium instructs the system to map adversary tactics based on the determined adversary tactics to develop an updated threat detection strategy. At 312, the machine-readable storage medium instructs the system to perform cybersecurity threat detection tests based on the updated threat detection strategy to determine a threat assessment score. At 314, the machine-readable storage medium instructs the system to contextualize the determined threat assessment score based on the selected threat framework. At 318, the machine-readable storage medium instructs the system to prioritize the determined cybersecurity gaps based on the threat assessment score and one or more factors associated with the organization's operational environment. At 320, the machine-readable storage medium instructs the system to provide automated recommendations and alerts regarding the cybersecurity performance gaps to overcome the cyber security threats and areas of the organization that require attention to avoid operational risk that affect the business operations of the organization.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

In one example, the threat framework may be selected from existing frameworks or built from scratch by an analyst. Further, the adversary tactics related to the selected threat framework may include tactics used to compromise at least one of network security, cloud security, endpoint security, and email security. The cybersecurity threat detection test may be run on one or more target computing systems, and wherein specific components of the target computing systems may be tested for vulnerabilities. Once the test results are obtained in the form of assessment scores, they may be contextualized by transforming the threat assessment score into categories such as alert, detect, and protect. Herein test result data may be extracted, wherein the results may include tactics used, systems tested, and capabilities that recorded protect, detect, and alert data from associated cybersecurity systems. The test data may further be transformed to protect, detect, and alert results and appropriate tactics may be selected from the threat framework. Further, these results may be archived and stored in the ERMS, the stored data may be queried and searched to retrieve them for the purpose of comparison, historical analysis, etc.

Herein, the cybersecurity gaps may be determined by rationalizing assessment scores based on weights provided to one or more categories of cybersecurity threats. Herein, users may be allowed to change scoring weights for protect, detect, and alert results. Further, users may be allowed to add Subject Matter Expert (SME) inputs that may be combined with test data with regards to specific threat tactics. The solution may further allow users to change weighting between threat assessments and capability mitigation.

In addition to assessing cybersecurity architecture of an organization, the solution may allow security analysts/personnel of an organization to be tested for their preparedness. Cybersecurity processes may be assessed by simulating one or more external threats. Based on the response provided by the systems, a cybersecurity process assessment score may be provided for the organization. Herein process may be defined as computer coded and automatically executed actions that connect technologies and people (personnel). Process actions occur when appropriate/pre-defined input is received. Processes do not occur exclusively between technology and people. They may occur within individual technologies, between different technologies, and between people. In one example, an alert may be a process that executes when certain criteria regarding threats occur. The process assessment score identified herein determines whether or not the processes associated with the cybersecurity framework is effective The cybersecurity gaps may be prioritized for each organization based on one or more of the following factors such as: weights provided to each sub-category of items in the selected threat framework, weights provided to the organization's business verticals, rationalized security assessment score, and cybersecurity process assessment score of an organization. Based on the prioritized cybersecurity gaps and cybersecurity process assessment score, automated recommendations may be provided to mitigate the cybersecurity risks and related organizational risks.

The result data obtained herein may also be used to recommend future areas of investments for the organization to improve its productivity and profit. The obtained score and data may be analysed to provide a wide range of useful actionable steps to an organization. In one example, based on the scores and based on the comparison with similarly placed organizations, best practices for mitigating possible cybersecurity performance gaps and future areas of investments may be recommended. The self-learning capabilities of the solution presented herein may retrieve data related to the historical trends and performance of the organization, compares this data with issues faced by similar organizations and provides actionable steps as recommendations.

In one example, the methods and systems provided herein provide automated recommendations to improve technology, process, and personnel performance of an organization when compared against known performance parameters of the organization (based on present and past data of the organization and similarly placed organizations). Herein the solution may combine threat assessment scores with capability mitigation results and further allow users to include and exclude results for capabilities and sub-system. It may further allow users to change weighting between threat assessments and capability mitigation and allow users to compare sub-system information to conduct what if and trade-off analysis to inform investment and divestment decisions. Furthermore, the solution provided herein may allow users to compare cybersecurity capabilities to conduct what if, trade-off and return on investment analysis. The results may be displayed as visual representations in a dashboard as described in FIGS. 4 to 6. Furthermore, the solution provided herein may allow organizations to identify industry benchmarks and tactics displaying significant risk within a set of organizations (sector based).

In one example, if test data is not available for one or more tactics, the present solution may alert the user regarding the same. This may enable further testing or expert assessment and scoring update thereby not missing out on any adversary tactic due to lack of data. The method may combine threat assessment scores and capability coverage scores (process assessment scores) with customized weights applied to each component to develop scores of tactical capabilities. These results are analyzed and aggregated to identify overall operational risk across an organization. This helps in identifying potential areas of investments for the organization to reduce operational risk and exposure to cybersecurity risks.

The solution provided herein may be advantageous compared to other known systems and solutions in that it provides a system to bring together disparate threat assessments, testing methodologies, data transformation, scoring algorithms, and combination of capability and assessment into a cybersecurity risk score that can be commonly used and understood across industries. Furthermore, automated risk calculation and recommendation based on empirical test data across cybersecurity technology, process, and personnel provide a comprehensive way to identify known threats thereby allowing business leaders to make informed business/investment decisions. Furthermore, the solution may enable the dissection of sub-system information and aggregation of data across multiple organizations to identify supply chain or industry trends.

Figure 4:
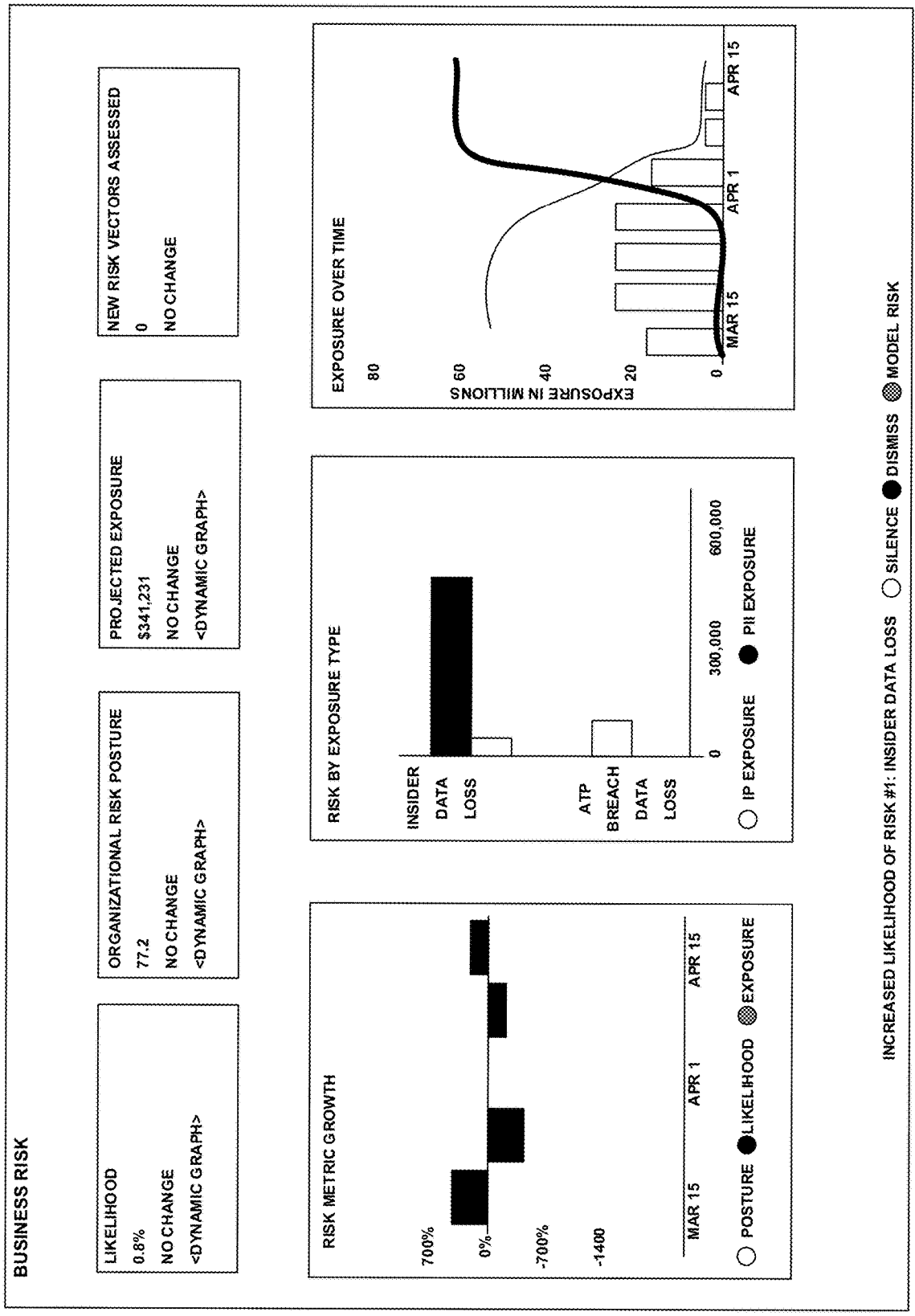
FIG. 4 is an exemplary view of a dashboard depicting data related to identified business risks in an organization according to the embodiments of the present disclosure.

FIG. 4 is an exemplary view 400 of a dashboard depicting data related to identified business risks in an organization according to the embodiments of the present disclosure. The dashboard may display visual representation of numerical results which may give valuable insights into various aspects of an organization's business. FIG. 4 displays data related to business risk, the insights provided by the dashboard is self-explanatory. Upon analysing various factors such as risk metric growth, risk by exposure type, exposure over time, projected exposure values, organizational risk posture, and the like, a recommendation may be provided regarding increased likelihood of risk due to insider data loss. A model of the risk and detailed insights may be provided to the user upon selecting the recommendation.

Figure 5:
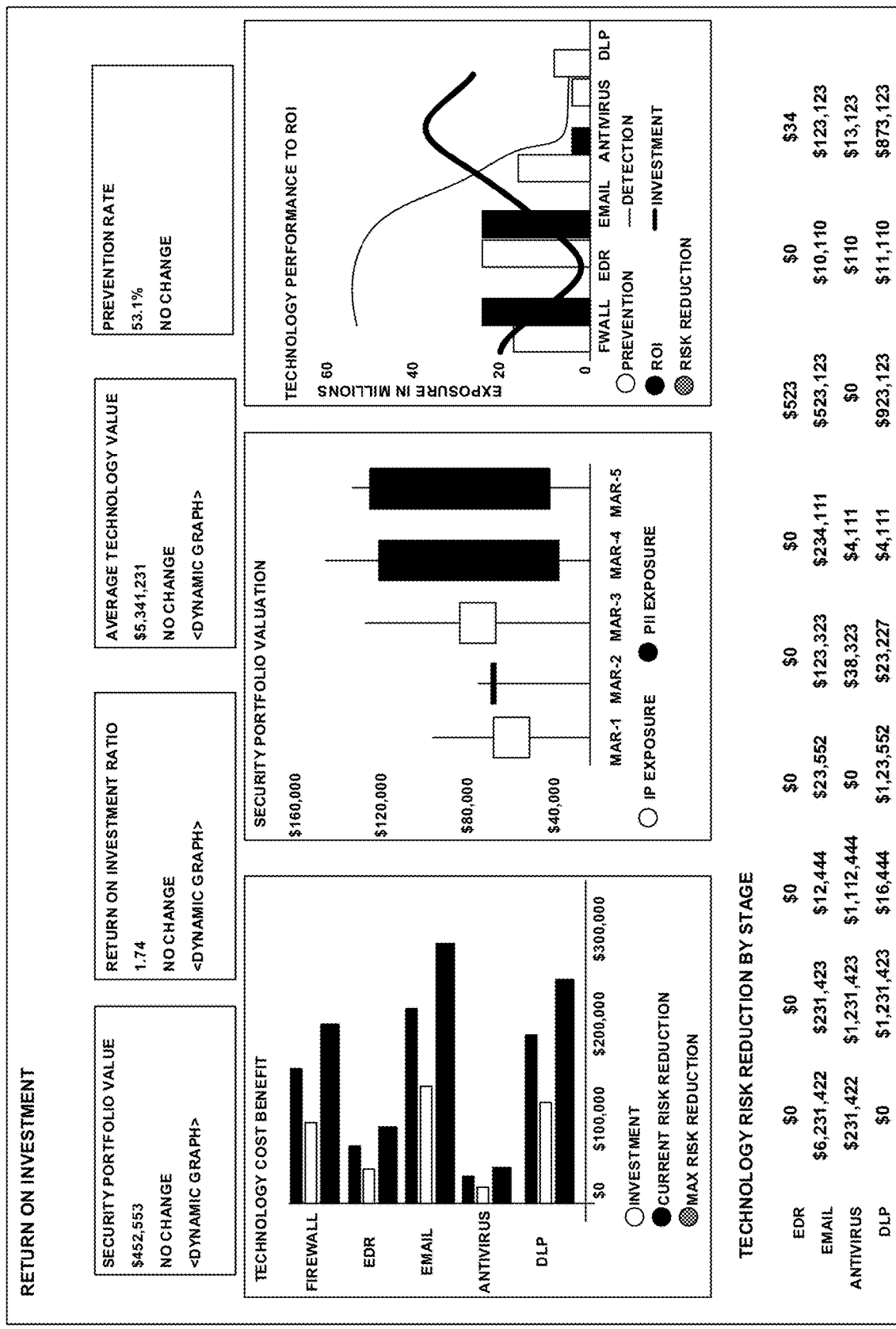
FIG. 5 is an exemplary view of a dashboard depicting data related to return of investment in an organization according to the embodiments of the present disclosure.

FIG. 5 is an exemplary view 500 of a dashboard depicting details data related to return of investment in an organization according to the embodiments of the present disclosure. The data displayed include information related to the return of investment particular to the organization. Data such as security portfolio value, return of investment ratio, average technology value and prevention rate are displayed. Graphs depicting recent trend may also be appended onto the dashboard. Graphs display technology cost benefit discloses investment done on specific areas such as email security, antivirus, firewall, etc. The chances of risk are visually represented by the graphs. Security portfolio valuation and technology performance to return of investment may also be identified and visually represented to the user at one place. Furthermore, the view includes a table representing technology risk reduction by stage providing valuable insights to the organization.

Figure 6:
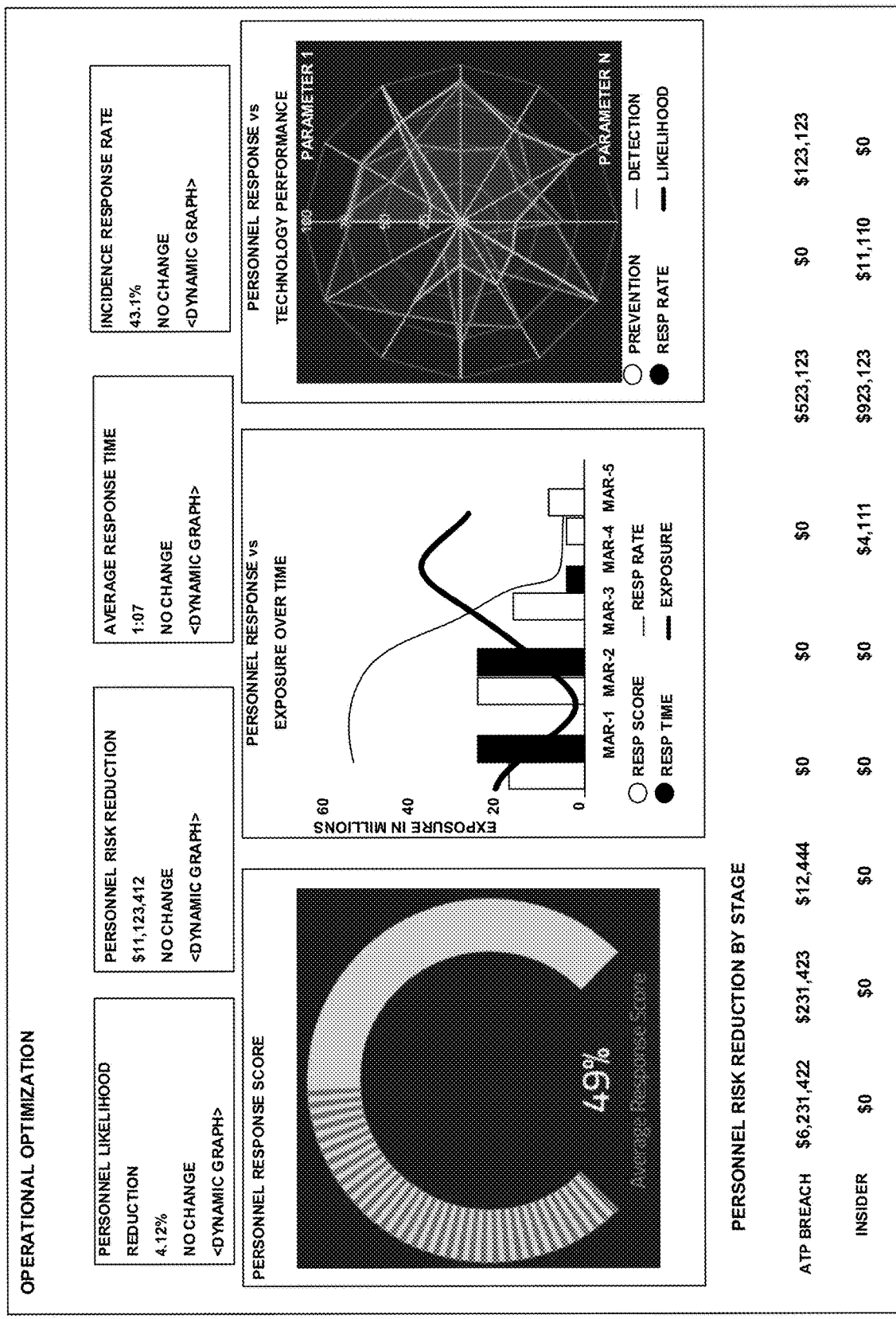
FIG. 6 is an exemplary view of a dashboard depicting operational optimization related data in an organization according to the embodiments of the present disclosure.

FIG. 6 is an exemplary view 600 of a dashboard depicting operational optimization related data in an organization according to the embodiments of the present disclosure. Based on the test data and assessment scores, information such as personnel likelihood of reduction, personnel risk reduction, average response time, and incidence response rate are displayed intuitively. Furthermore, personnel response score may be displayed as a graph. In addition, the dashboard may display valuable insights such as graph depiction personnel response with respect to exposure over time, personnel response with respect to technology performance, and the like. A table depicting stage-wise personnel risk reduction may also be provided by the dashboard. The insights provided herein are determined based on the test results scores and their analysis. FIG. 7 is an exemplary view 700 of a dashboard summarizing various cybersecurity risks in an organization according to the embodiments of the present disclosure. Furthermore, a plurality of recommendations may be also provided based on the identified organizational risks.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A computer-implemented method for mitigating cybersecurity performance gaps in an organization, comprising:
    selecting a threat framework for formulating a threat detection strategy;
    determining adversary tactics that are used to circumvent the threat detection strategy related to the selected threat framework;
    mapping adversary tactics based on the determined adversary tactics to develop an updated threat detection strategy;
    performing cybersecurity threat detection tests based on the updated threat detection strategy to determine a threat assessment score;
    contextualizing the determined threat assessment score based on the selected threat framework;
    determining cybersecurity performance gaps based on the contextualized threat assessment score, wherein the cybersecurity performance gaps are determined by rationalizing the threat assessment score based on weights provided to one or more categories of cybersecurity threats;

prioritizing the determined cybersecurity performance gaps based on the contextualized threat assessment score and one or more factors associated with the organization's operational environment;
assessing security analysts of the organization by simulating one or more external threats and determining a cybersecurity process assessment score for the organization; and
providing automated recommendations and alerts regarding the cybersecurity performance gaps and their effects on operational risks and business exposure of the organization, wherein the automated recommendations are provided based on the prioritized cybersecurity performance gaps and cybersecurity process assessment score.

2. The computer-implemented method of claim 1, wherein the threat framework is selected from existing frameworks or built from scratch.

3. The computer-implemented method of claim 1, wherein the adversary tactics related to the selected threat framework include tactics used to compromise at least one of network security, cloud security, endpoint security, and email security.

4. The computer-implemented method of claim 1, wherein the cybersecurity threat detection tests are run on one or more target computing systems, and wherein specific components of the one or more target computing systems are tested for performance against probable threats.

5. The computer-implemented method of claim 1, wherein contextualizing the determined threat assessment score comprises transforming the threat assessment score into data categories including alert, detect, and protect.

6. The computer-implemented method of claim 5, wherein alert data is related to cybersecurity performance alerts that are to be sent for alerting probable threat activities, detect data is related to cybersecurity threats that are identified, and protect data is related to cybersecurity threats that were blocked by an existing cybersecurity system.

7. The computer-implemented method of claim 1, wherein the one or more factors associated with the organization's operational environment that are used to prioritize the threat assessment score comprise at least one of weights provided to each sub-category of items in the selected threat framework, weights provided to the organization's business verticals, rationalized threat assessment score, and cybersecurity process assessment score of the organization.

8. A system, comprising:
at least one processor; and
    at least one non-transitory computer readable storage medium storing instructions thereon that, when executed by the at least one processor, cause the system to:
    select a threat framework for formulating a threat detection strategy;
    determine adversary tactics that are used to circumvent the threat detection strategy related to the selected threat framework;
    map adversary tactics based on the determined tactics to develop an updated threat detection strategy;
    perform a cybersecurity threat detection test based on the updated threat detection strategy to determine a threat assessment score;
    contextualize the determined threat assessment score based on the selected threat framework;
    determine cybersecurity performance gaps based on the contextualized threat assessment score, wherein the cybersecurity performance gaps are determined by rationalizing the threat assessment score based on weights provided to one or more categories of cybersecurity threats;
    prioritize the determined cybersecurity gaps based on the contextualized threat assessment score and one or more factors associated with the organization's operational environment;
    assess security analysts of the organization by simulating one or more external threats and determining a cybersecurity process assessment score for the organization; and
    provide automated recommendations and alerts regarding the cybersecurity performances gaps and their effect on the operational risk and business exposure of the organization, wherein the automated recommendations are provided based on the prioritized cybersecurity performance gaps and cybersecurity process assessment score.

9. The system of claim 8, wherein the one or more factors associated with the organization's operational environment that are used to prioritize the threat assessment score comprise at least one of weights provided to each sub-category of items in the selected threat framework, weights provided to the organization's business verticals, rationalized threat assessment score, and cybersecurity process assessment score of the organization.

10. A non-transitory computer readable medium storing instructions thereon that, when executed by at least one processor, cause a computer system to:
    select a threat framework for formulating a threat detection strategy;
    determine adversary tactics that are used to circumvent the threat detection strategy related to the selected threat framework;
    map adversary tactics based on the determined tactics to develop an updated threat detection strategy;
    perform a cybersecurity threat detection test based on the updated threat detection strategy to determine a threat assessment score;
    contextualize the determined threat assessment score based on the selected threat framework;
    determine cybersecurity performance gaps based on the contextualized threat assessment score, wherein the cybersecurity performance gaps are determined by rationalizing the threat assessment score based on weights provided to one or more categories of cybersecurity threats;
    prioritize the determined cybersecurity gaps based on the contextualized threat assessment score and one or more factors associated with the organization's operational environment;
    assess security analysts of the organization by simulating one or more external threats and determining a cybersecurity process assessment score for the organization; and
    provide automated recommendations and alerts regarding the cyber security performance gaps and their effect on the operational risk and business exposure of the organization, wherein the automated recommendations are provided based on the prioritized cybersecurity performance gaps and cybersecurity process assessment score.

11. The non-transitory computer readable medium of claim 10, wherein the one or more factors associated with the organization's operational environment that are used to prioritize the threat assessment score comprise at least one of weights provided to each sub-category of items in the selected threat framework, weights provided to the organization's business verticals, rationalized threat assessment score, and cybersecurity process assessment score of the organization.

* * * * *